US012686560B2

(12) United States Patent
Von Liechtenstein

(10) Patent No.: US 12,686,560 B2
(45) Date of Patent: Jul. 21, 2026

(54) AUTOMATED HANDLING UNIT AND PROCEDURE FOR BOXED ITEMS

(71) Applicant: PHARMATHEK S.R.L., Verona (IT)

(72) Inventor: Alexander Von Liechtenstein, Triesenberg (LI)

(73) Assignee: PHARMATHEK S.R.L., Verona (IT)

( * ) Notice: Subject to any disclaimer, the term of this patent is extended or adjusted under 35 U.S.C. 154(b) by 323 days.

(21) Appl. No.: 18/617,344

(22) Filed: Mar. 26, 2024

(65) Prior Publication Data

US 2025/0304367 A1     Oct. 2, 2025

(51) Int. Cl.
    *B65G 1/04*        (2006.01)
(52) U.S. Cl.
    CPC ......... *B65G 1/0435* (2013.01); *B65G 1/0421* (2013.01); *B65G 2201/025* (2013.01)
(58) Field of Classification Search
    CPC ...... B65G 1/0492; B65G 1/0435; B65G 1/06; B65G 1/1378
    See application file for complete search history.

(56) References Cited

U.S. PATENT DOCUMENTS

| | | | |
|---|---|---|---|
| 2010/0204822 A1* | 8/2010 | Clo' | B65G 1/0407 700/218 |
| 2015/0104278 A1 | 4/2015 | Von Liechtenstein et al. | |
| 2018/0029796 A1 | 2/2018 | De Vries | |
| 2018/0127208 A1* | 5/2018 | Preidt | B65G 1/0485 |

FOREIGN PATENT DOCUMENTS

| | | | | |
|---|---|---|---|---|
| DE | 102005012516 A1 * | 9/2006 | | G07F 11/165 |
| DE | 102008003157 A1 * | 9/2009 | | B65G 47/82 |
| DE | 102011002322 A1 * | 10/2012 | | B65G 1/0435 |
| EP | 1842803 A1 * | 10/2007 | | B65G 1/08 |
| EP | 1980503 A1 * | 10/2008 | | B65G 1/0435 |
| FR | 2881935 A1 * | 8/2006 | | B65G 1/0435 |
| WO | 2009079678 A1 | 7/2009 | | |
| WO | 2016141395 A1 | 9/2016 | | |

OTHER PUBLICATIONS

Search Report and Written Opinion of IT Application No. 202300003996 dated Sep. 12, 2023, 7 pages.

* cited by examiner

*Primary Examiner* — Kaitlin S Joerger
(74) *Attorney, Agent, or Firm* — NIXON & VANDERHYE

(57) ABSTRACT

An automated handling procedure for boxed items (3) is provided, which includes arranging on a storage surface (2) boxed items (3) aligned in rows (6) along their respective predominant development direction (6*a*) in dimensionally decreasing order, for each row (6), towards a first edge (20) of the storage surface (2); unitarily translating along the predominant development direction (6*a*) on a handling surface (40) of a frame (4) facing the first edge (20) a group of said boxed items (3) consisting of at least a portion of a row (6); moving the frame (4) close to a sorting surface (8) so that the handling surface (40) is aligned with the sorting surface (8); taking at least one end boxed item (3) of the group from the handling surface (40) to the sorting surface (8); returning the handling surface (40) close to the storage surface (2); repositioning any elements of the group on the storage surface (2) at a row (6), and sending at least one boxed item (3) to delivery on the sorting surface (8); wherein during the translation, an entire row (6) is translated along said predominant development direction (6*a*) so that the residual row (6) on the storage surface (2) is adjacent to the first edge (20**).

10 Claims, 6 Drawing Sheets

AUTOMATED HANDLING UNIT AND PROCEDURE FOR BOXED ITEMS

The present invention relates to a unit and an automated handling procedure for boxed items of the type specified in the preamble of the first claim.

In particular, it relates to a unit and a procedure for the automated loading and unloading of boxed items or similar onto and from the shelves of a shelving unit wherein said elements are densely stacked and in multiple rows.

As is known, there are automated systems on the market for handling objects of relatively small dimensions and weight, for example weighing less than 2 kg.

The known systems allow to store and automatically retrieve objects on shelving units equipped with open shelves and have several advantages.

For example, they allow very large shelving units, as the space for an operator's movement is not necessary, they have an acceptable movement speed, require and allow a reduced use of personnel.

The procedure for automatic storage involves with them various steps.

Initially, the objects to be loaded, for example various packages, are identified and catalogued, for instance by scanning the appropriate barcode or similar. The object's dimensions are then processed by a specific electronic processor which also determines the best position for that object on the shelves, based on available spaces.

Subsequently, the object is loaded into a terminal handling unit that takes it to the identified position on the shelves and deposits it therein.

Then, the unloading of the same from the shelving may become necessary.

In such a case, it is necessary to ask for the same object to the electronic processor, which has stored the object's position.

The handling unit is then guided at the object to be picked up, picks it up, and takes it to a position accessible to the user.

The above-mentioned known technique has, along with said advantages, also some disadvantages.

In particular, the known handling units are generally complex and expensive, as they have to perform various loading and unloading operations into and from the shelves. A further inconvenience is given by the fact that some known units are generally adapted to transport a single object at a time, consequently slowing down loading and unloading operations. Other units are adapted to transport multiple elements but are still slow and complex.

This inconvenience is significant during unloading, when a rapid delivery of objects is required.

It should also be noted that these inconveniences become more significant as the number and variety of boxed items and similar to be handled increases, due to the growing variety of items available to consumers.

In this situation, the technical task at the basis of the present invention is to devise a unit and an automated handling procedure for boxed items capable of substantially overcoming at least part of the above-mentioned inconveniences.

Within the scope of said technical task, an important aim of the invention is to devise a unit and an automated handling procedure for boxed items that is simple to achieve and implement, therefore being able to offer maximum guarantees of functionality and implementable at lower costs.

Another important aim of the invention is to devise a unit and an automated handling procedure for boxed items capable of optimally exploiting the spaces available on the shelves of a shelving unit.

A further aim of the invention is to devise a unit and an automated handling procedure for boxed items capable of simultaneously handling multiple boxed items or similar, thus allowing maximum loading and unloading speed of the boxed items.

The technical task and stated aims are achieved by a unit, and related procedure, for the automated handling of boxed items as claimed in the attached claim 1.

Preferred technical solutions are highlighted in the dependent claims.

The features and advantages of the invention are further clarified below by the detailed description of preferred embodiments of the invention, with reference to the attached drawings, wherein:

FIG. 1 shows a schematic view of the automated handling unit for boxed items according to the invention, placed near a storage surface of a counter holding a plurality of rows of boxed items;

FIG. 2 schematically shows the beginning of a translation step on the handling surface of a group of boxed items forming part of a row achieved by the automated handling unit for boxed items according to the invention;

FIG. 3 highlights how the translation step proceeds after FIG. 2, in particular showing the moving forwards of the hindering means and the approaching of the boxed items of the designated group at the contact area on the handling surface;

Figure 1:
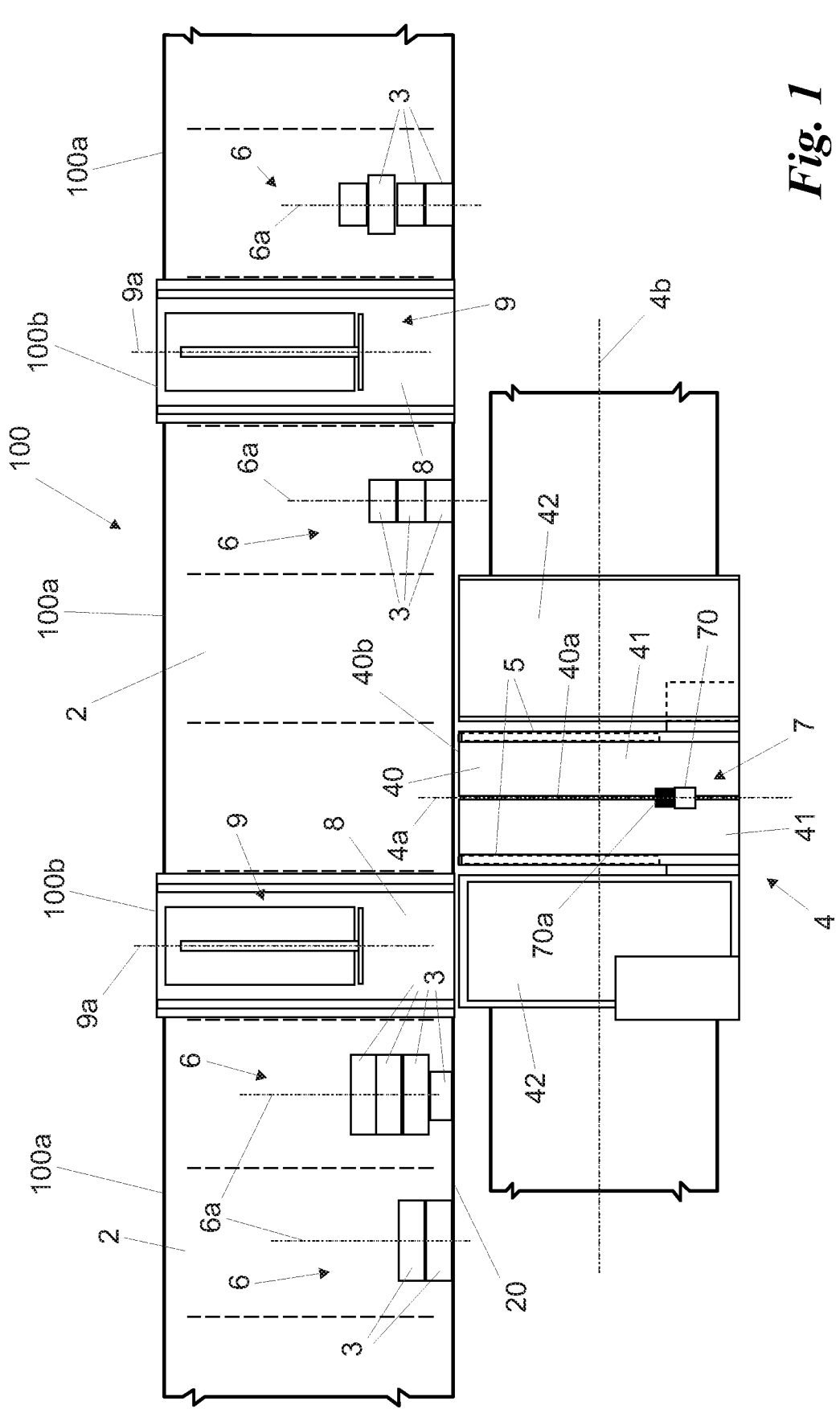
Figure 2:
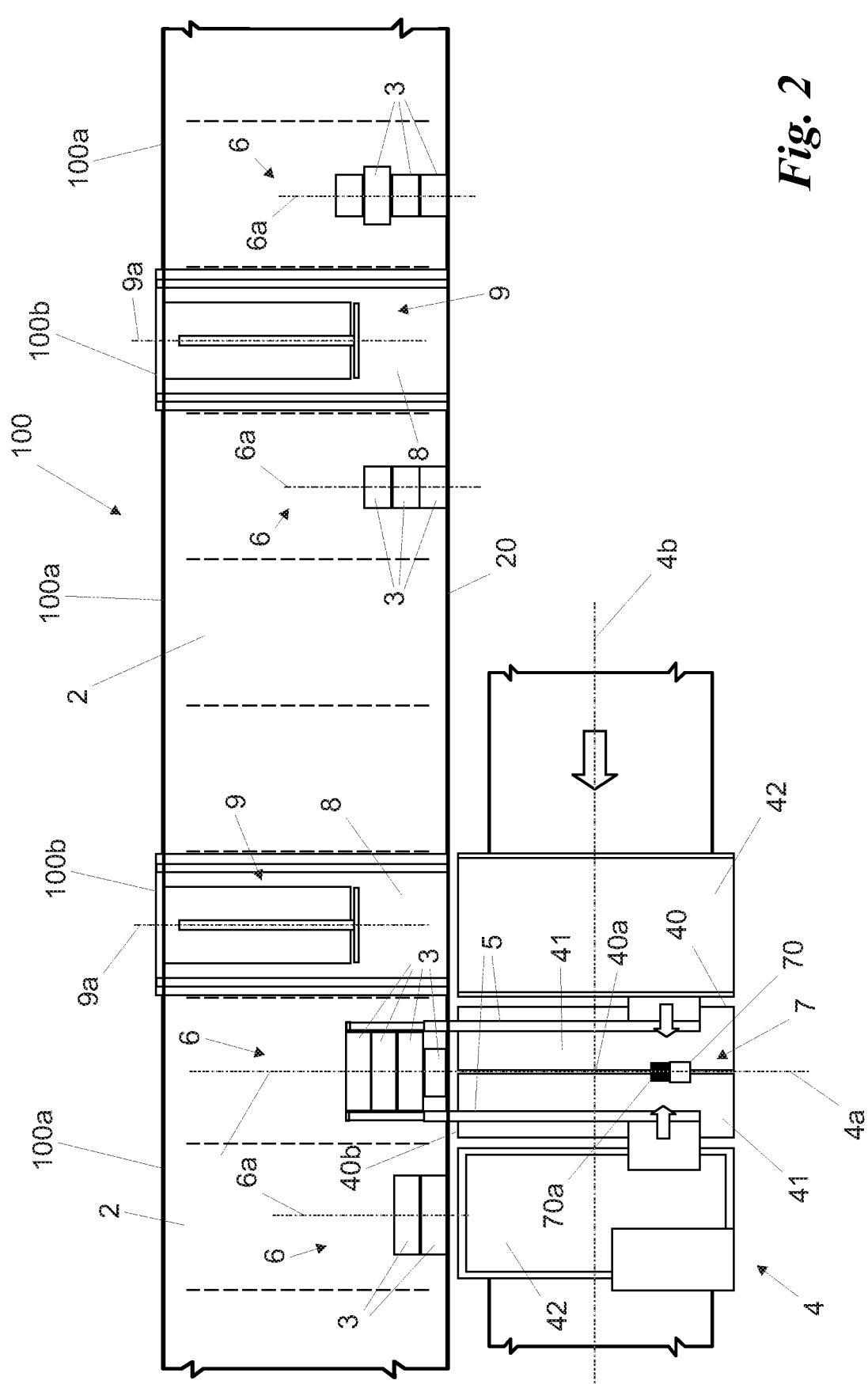
Figure 3:
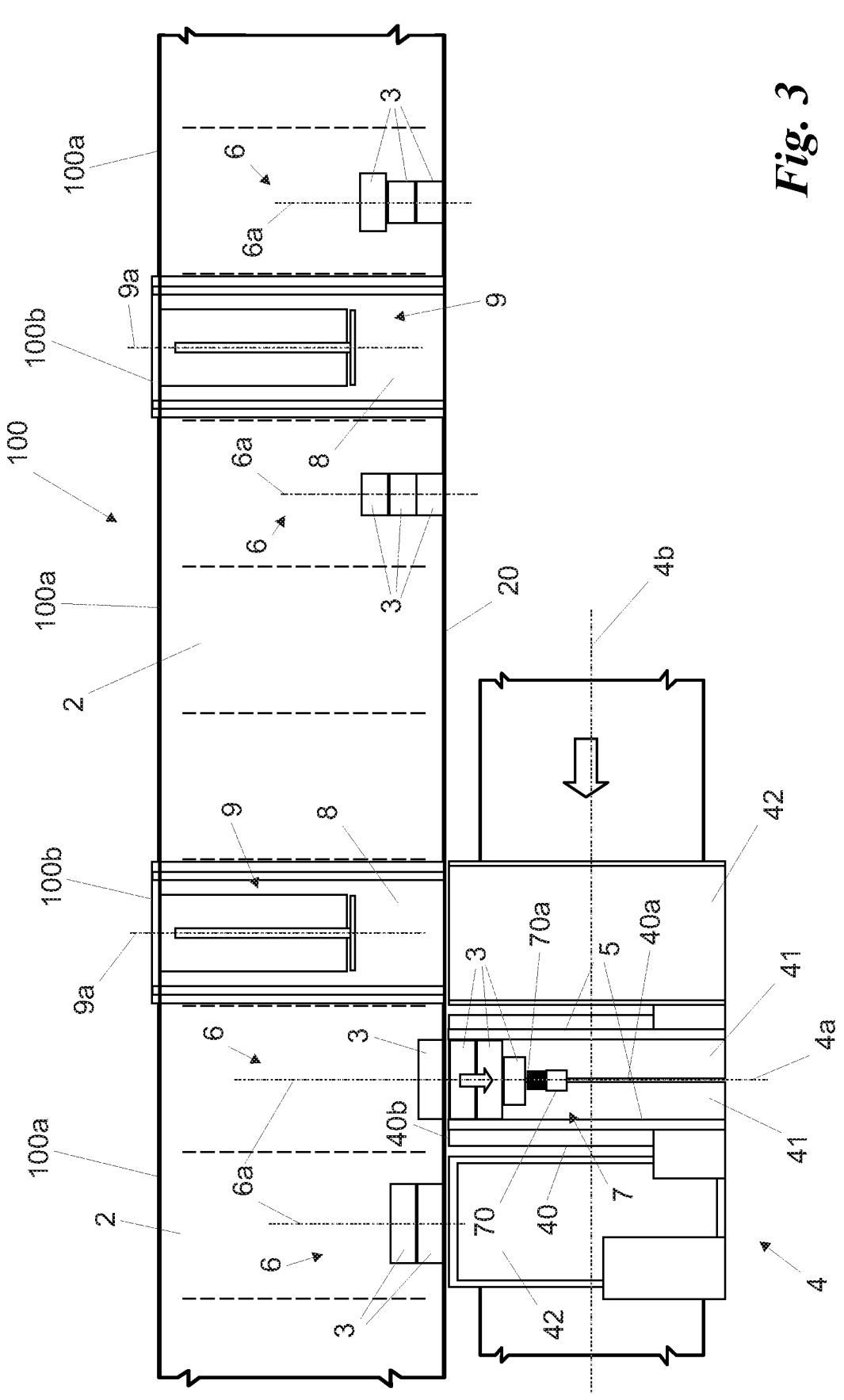
Figure 4:
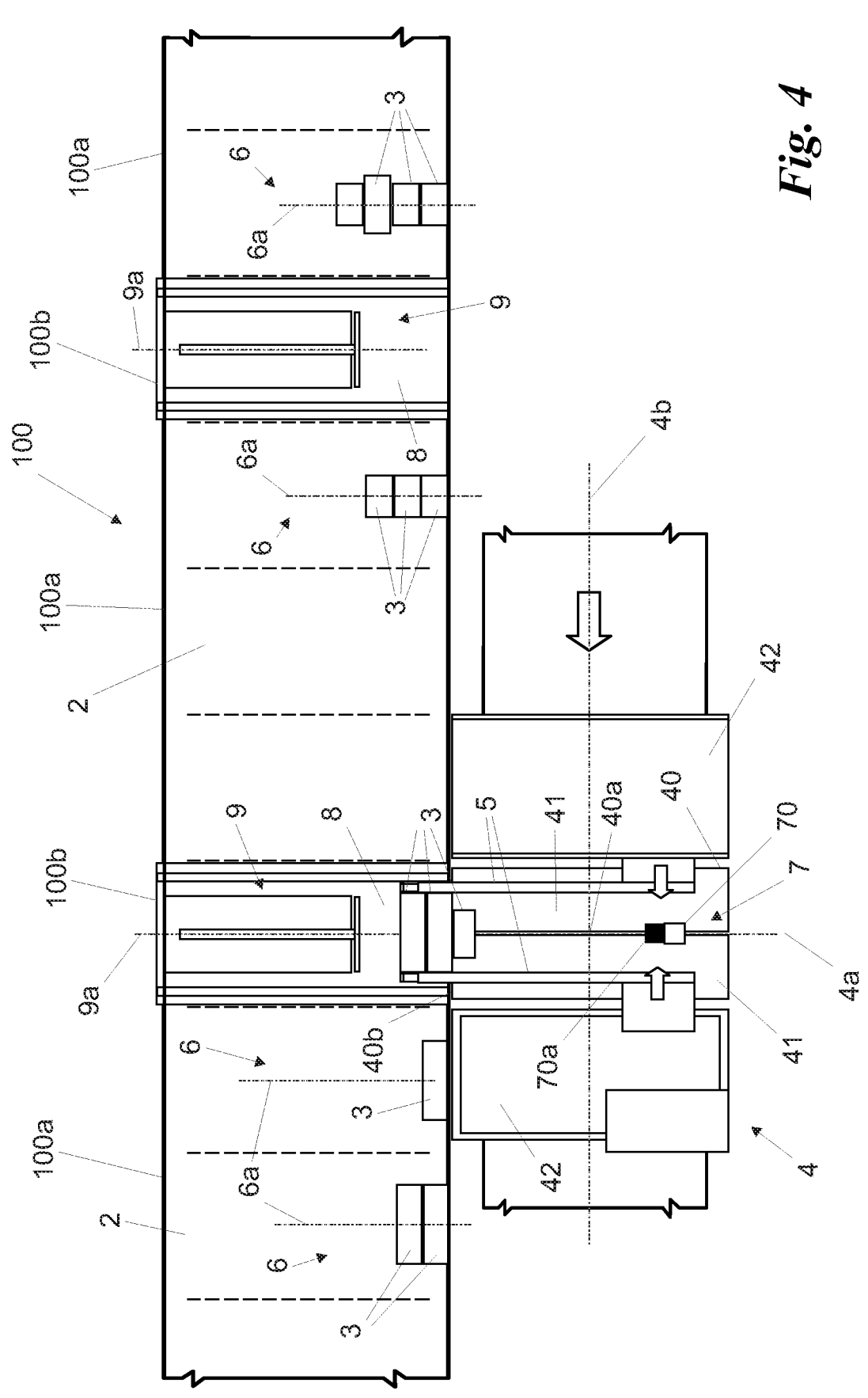
FIG. 4 represents the handling step, after the frame movement step at the sorting surface, on the sorting surface of the boxed items at the end of the group of boxed items present on the handling surface.

In this document, measures, values, shapes, and geometric references (such as perpendicularity and parallelism), when associated with words like "approximately" or other similar terms such as "almost" or "substantially", are to be understood as allowing measurement errors or inaccuracies due to production and/or manufacturing errors and, above all, allowing a slight deviation from the value, measure, shape, or geometric reference associated with it. For example, such terms, if associated with a value, preferably indicate a deviation not exceeding 10% of the value itself.

Furthermore, when used, terms like "first", "second", "upper", "lower", "main", and "secondary" do not necessarily identify an order, a priority of relationship or relative position but can be simply used to more clearly distinguish different components from one another.

Unless otherwise specified, as obvious from the following discussions, terms like "treatment", "computing", "determination", "calculation", or similar, refer to the action and/or processes of a computer or similar electronic computing device that manages and/or transforms data represented as physical, such as electronic quantities of registers of a computing system and/or memories into other data similarly represented as physical quantities within computing systems, registers, or other information storage, transmission, or display devices.

The measurements and data reported in this text are to be considered, unless otherwise indicated, as carried out in International Standard Atmosphere ICAO (ISO 2533:1975).

Referring to the Figures, the automated handling unit for boxed items according to the invention is globally denoted by number 1.

In general, the unit 1

The unit 1 may appear, for example, as the active part of a distributor of a shelving plant.

The distributor is adapted to allow the sorting of goods inside of it by the aforementioned unit 1.

Therefore, preferably, the distributor comprises at least one storage surface 2.

The storage surface 2 is substantially given by any holding surface, capable of stably holding objects resting on it.

In particular, preferably, the storage surface 2 is adapted to allow holding boxed items 3.

In practice, the boxed items 3 or similar are generally parallelepiped packages of various products and items. For example, the boxed items 3 may consist of packages of pharmaceutical products.

Furthermore, preferably, the boxed items 3 arranged, aligned one another, on the storage surface along a predominant development direction 6a in such a way as to define at least one row 6.

Preferably each row 6 has homogeneous or equal boxed items 3 and in case of elements 3 different from each other in size, the bigger ones are preferably placed at the maximum distance from the unit 1.

Naturally, the boxed items 3 could define a plurality of rows 6 mutually parallel and defining their own predominant development directions 6a.

Indeed, the distributor is preferably adapted to be employed in shopping centres, shops, distribution centres that sell a large number of products and items and a great variety thereof and therefore need large storage surfaces and also a rapid automated delivery of the items.

In a preferred embodiment, the distributor is part of, or constituted by, a counter 100. The counter 100 is preferably a goods accumulation device that can also be used for other purposes. For example, the counter 100 can be a pharmacy counter, therefore provided with a plurality of compartments wherein medicinal or nutraceutical products are placed.

Therefore, the counter 100 may comprise at least a first compartment 100a. The first compartment 100a substantially consists of a shelving that includes one or more floors. Thus, the one or more floors can collectively define the storage surface 2.

Thus, the storage surface 2 can be defined by a continuous floor or partitioned and distributed on parallel or coplanar and consecutive floors.

On each of the shelves, there may be one or more rows 6 of boxed items 3.

The distributor may also include a base apparatus, known per se, capable of translating the unit 1 at the storage surfaces 2. For example, the base apparatus may include columnar elements developing above carts resting on the ground or floor and equipped with hooks or guides on the shelving, to horizontally translate the unit 1. To vertically translate unit 1, it can be connected to pneumatic or electric lifting means, placed at the columnar elements.

A distributor is for example indicated in patent EP 2113437 by the same applicant.

In any case, the unit 1 is adapted to engage and handle a plurality of boxed items 3 to alternately perform pickup or storage of the boxed items 3 on the storage surface 2.

In this regard, preferably, unit 1 includes a frame 4.

When the unit 1 is used in the distributor, the frame 4 is substantially configured to translate with respect to the storage surface 2 thanks to the base apparatus.

In particular, the unit 1 moves with respect to the storage surface 2 in such a way as to face it at its first edge 20. Therefore, the storage surface 2 defines an end or border that essentially forms the first edge 20.

The first edge 20 may develop, for example, along a straight axis; especially if the storage surface 2 is part of a counter 100.

Therefore, the frame 4 can be configured to move along a movement axis 4b. In this case, the movement axis 4b is preferably parallel to the straight development axis of the first edge 20.

In general, therefore, the frame 4 is preferably movable with respect to the storage surface 2.

Furthermore, the frame 4 also includes a handling surface 40.

The handling surface 40 is adapted to be arranged close to the storage surface 2. Even more in detail, the handling surface 40 is adapted to be aligned with the storage surface 2.

Preferably, the handling surface 40 is adapted to be arranged close to the storage surface 2 at the predominant development direction 6a.

Moreover, the handling surface 40 is preferably movable along a central axis 4a. The central axis 4a can preferably be aligned with the predominant development direction 6a. Therefore, the handling surface 40 is configured in such a way that, when the central axis 4a is aligned with the predominant development direction 6a, the boxed items 3 can be translated along the predominant development direction 6a.

More in detail, preferably, when the unit 1 is in use in a distributor implemented in a counter 100, as previously described, preferably the central axis 4a is transversal to the movement axis 4b, for example perpendicular.

Therefore, if the distributor includes a plurality of rows 6 of boxed items 3 distributed along the storage surface 2, the handling surface 40 can be moved from row 6 to row 6 by moving the frame 4 along the movement axis 4b. As already mentioned earlier, if useful, the handling surface 40 can also be moved vertically, along an axis perpendicular to the plane defined by the central axis 4a and movement axis 4b, for example if the storage surface 2 is distributed on a shelving unit with multiple floors. The unit 1 also comprises gripping bars 5.

Preferably, the gripping bars 5 develop near the handling surface 40. For example, the gripping bars 5 can be placed above the handling surface 40.

Moreover, preferably, they are in a number of two and side by side and spaced apart in such a way as to flank or contain or delimit at least part of a row 6.

Therefore, preferably, the gripping bars 5 develop parallel to the predominant development direction 6a.

The plant 1, naturally, includes control and guiding means, known per se, engaging and supporting the gripping bars 5 and adapted to move them both parallel and transversally to the central axis 4a, that is to the predominant development direction 6a when the central axis 4a and the predominant development direction 6a are aligned.

In general, the gripping bars 5 are configured to engage and translate at least part of the boxed items 3 of the row 6.

In particular, in this regard, preferably the gripping bars 5 are configured to translate with respect to the handling surface 40 specularly along the central axis 4*a* in such a way as to selectively bring said one or more boxed items 3 closer.

Therefore, the control and guiding means can approach and move away the gripping bars 5, so as to clamp the same on the row 6 of boxed items 3 and in particular on the boxed item 3 at the end of the row 6 in a distal position or further away from the frame 4, in such a way as to be able to move the entire row 6 in a single movement.

In case of limited advancement of the gripping bars 5, that is up to a position of not complete crossing of the storage surface 2, another element 3 of the row 6 can still be clamped.

For the reciprocal approaching and moving away of the gripping bars 5, the control and guiding means may for example include pneumatic or hydraulic or oleodynamic cylinders, possibly combined with levers and/or channel or tubular guides.

It is emphasized that the control and guiding means of the gripping bars 5 can be structured and arranged according to a great variety of technical solutions and in a way, as already mentioned, immediately realizable by a mechanical technician.

For example, the control and guiding means can be directly supported by the frame 4 and protrude as articulated arms towards the gripping bars 5, in order to support and guide the same, also through electric motors placed terminally to the articulated arms and active through toothed wheels on racks made on the gripping bars 5 or integral with the same.

The gripping bars 5 can each present at least one gripping organ adapted to engage a boxed item 3.

The gripping organ can, for example, consist of the terminal portion of each gripping bar 5 preferably equipped with a rough surface with a high friction coefficient or similar adapted to laterally engage one or more boxed items 3 of a row 6, or the terminal portions of the gripping bars 5, can also be devoid of any coating or lateral extension.

Additional gripping members may be provided, for example suction cups or elastic means, or others.

The gripping elements preferably do not have the task of forcefully engaging and lifting a row 6 or elements of the row 6 but only of sliding the row 6 onto the storage surface 2 and then onto the handling surface 40.

In addition to what has been described, in order to increase the gripping capacity of the gripping bars 5, each of them is preferably telescopic.

Moreover, preferably, each gripping bar 5 is configured to expand proportionally to its translation along the handling surface 40.

In this way, advantageously, each gripping bar 5 can increase its travel with respect to the handling surface 40 at least when each bar 5 extends beyond the handling surface 40. This configuration allows the unit 1 to be used efficiently even for very deep storage surfaces 2, such as those of a counter 100.

The unit 1 advantageously also includes a hindering means 7.

The hindering means 7 is positioned, like the gripping bars 5, close to the handling surface 40. In particular, the hindering means 7 may, at least in part, be positioned above the handling surface 40.

Thus, the hindering means 7 is configured to stop the boxed items 3 from moving onto the handling surface 40 at a position occupied by the hindering means 7 itself. In other words, the hindering means 7 prevents the boxed items 3 from falling from the handling surface 40 when moved along the central axis 4*a*. Therefore, the hindering means 7 determines a stop for the boxed items 3 on the handling surface 40.

Preferably, the hindering means 7 is movable relative to the handling surface 40 so as to be able to vary the position occupied.

To implement the relative movement between hindering means 7 and handling surface 40, advantageously, the handling surface 40 includes a slit 40*a*.

The slit 40*a* preferably develops along the central axis 4*a*. Moreover, the slit 40*a* develops along the central axis 4*a* continuously.

Thus, the slit 40*a* is substantially defined by a groove that develops on the handling surface 40 preferably from side to side and from end to end.

To structurally define the slit 40*a*, the frame 4 can for example include a pair of tracks 41.

If present, tracks 41 are placed side by side and separated by the slit 40*a*. Thus, the tracks 41 constitute, at their own side, the handling surface 40. In other words, the tracks 41 each define a moving belt that defines the handling surface 40 when facing the gripping bars 5.

The frame 4, moreover, preferably includes motion means configured to specularly move the tracks 41. The motion means may include, for example, at least two end rolling elements spaced apart along the central axis 4*a*, for both or each track 41. This means that each track 41 could have its own rolling elements or the rolling elements could simultaneously move both tracks 41.

In any case, the rolling elements are configured to tension each track 41 and rotate the tracks 41 proportionally to a rotation of the rolling elements around their own rotation axis transverse to the central axis 4*a*.

The hindering means 7 is, therefore, advantageously at least partially housed in the slit 40*a*. Moreover, the hindering means 7 is configured to move in the slit 40*a* along the central axis 4*a* so that, as already mentioned, it can vary the position occupied on the handling surface 40. Naturally, the movement allows the hindering means 7 to concurrently push one or more boxed items 3 along the central axis 4*a*.

Even more in detail, the hindering means 7 may include a head 70, a body, and translation means.

The head 70 is preferably protruding from the slit 40*a* transversally to said handling surface 40. Therefore, the head 70 is the portion of hindering means 7 adapted to contact the boxed items 3. In fact, preferably, the head 70 includes at least one contact area 70*a*.

The contact area 70*a* is adapted to contact a boxed item 3 to stop it or push it. Therefore, the contact area 70*a* can, for example, be soft and/or include serrations designed to increase the grip on the boxed item 3.

The body is preferably integral with the head 70. Thus, it is housed in the slit 40*a*. The translation means preferably face a side of the handling surface 40 opposite to the head 70. Thus, they are below the handling surface 40.

Moreover, the translation means are configured to move the body along the central axis 4*a*. The translation means may include a linear actuator or another device capable of implementing the overall movement of the hindering means 7 along the central axis 4*a*.

If the unit 1 is placed inside a distributor, the latter preferably includes, in addition to the storage surface 2, also a sorting surface 8.

The sorting surface 8 is adapted, like the storage surface 2, to receive one or more boxed items 3. Therefore, it allows to support at least one boxed item 3, at least temporarily.

Even more in detail, the sorting surface 8 is configured so that the frame 4 can move from the storage surface 2 to the sorting surface 8 and vice versa.

Moreover, the sorting surface 8 is preferably configured so that, when the handling surface 40 is placed close to the sorting surface 8, the handling surface 40 is aligned with the sorting surface 8. In this way, the handling surface 40 can selectively handle one or more boxed items 3 placed on it.

In the simplest embodiment, the sorting surface 8 is aligned with the storage surface 2 so that a simple translatory movement of the frame 4 along the movement axis 4*b* can allow passing from the storage surface 2 to the sorting surface 8, and vice versa. The sorting surface 8 thus defines a kind of station by which the boxed items 3 deposited therein can be sent to delivery.

Therefore, preferably, the distributor can also include a pusher 9.

The pusher 9, if present, is placed on the sorting surface 8. Moreover, it is movable relative to the sorting surface 8 along at least one pushing direction 9*a*. The pushing direction 9*a* is preferably parallel to the central axis 4*a*, in particular aligned with the central axis 4*a* when the frame 4 faces the sorting surface 8.

The pusher 9 is thus configured so as to push out of the sorting surface 8 one or more boxed items 3 placed on the sorting surface 8.

The distributor can therefore include a stacking unit 10.

The stacking unit 10, if present, may be placed near the sorting surface 8. Moreover, when the pusher 9 pushes one or more boxed items 3 out of the sorting surface 8, it is configured so that, the boxed items 3 fall by gravity into the stacking unit 10. Alternatively, the frame 4 may include one or more sides 42.

If present, the side 42 is aligned with the handling surface 40. Moreover, it is adjacent to the handling surface 40 and side by side in to it perpendicularly to the central axis 4*a*.

If there are two sides 42, the latter are placed at opposite sides of the handling surface 40. Therefore, the latter can be placed between the two sides 42.

In any case, preferably, the side 42 can be configured to guide the sliding of one or more boxed items 3 from the sorting surface 8 to the stacking unit 10.

Figure 5:
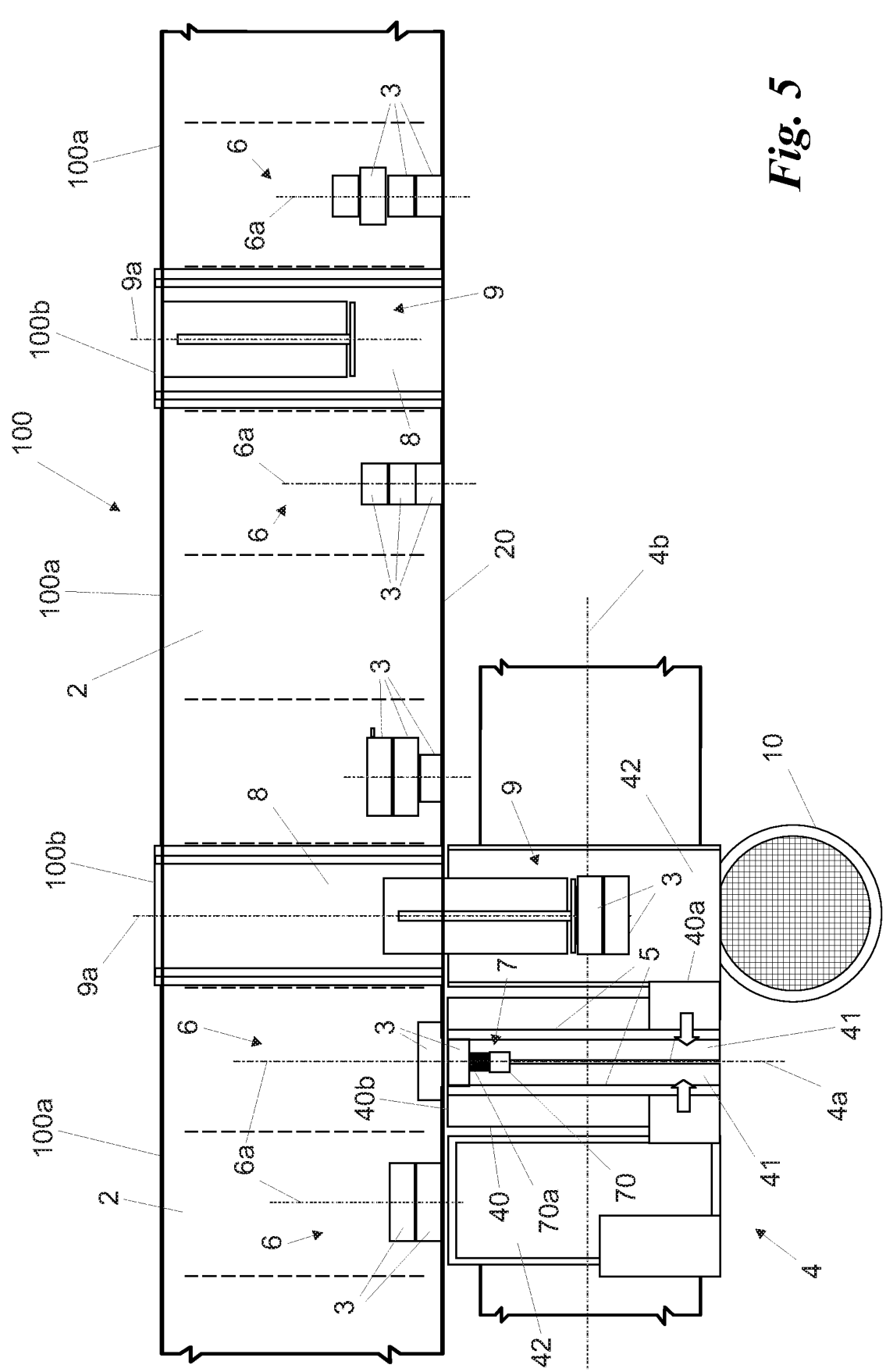
FIG. 5 shows the beginning of the repositioning step simultaneously with the prompting step for the boxed items.
Figure 6:
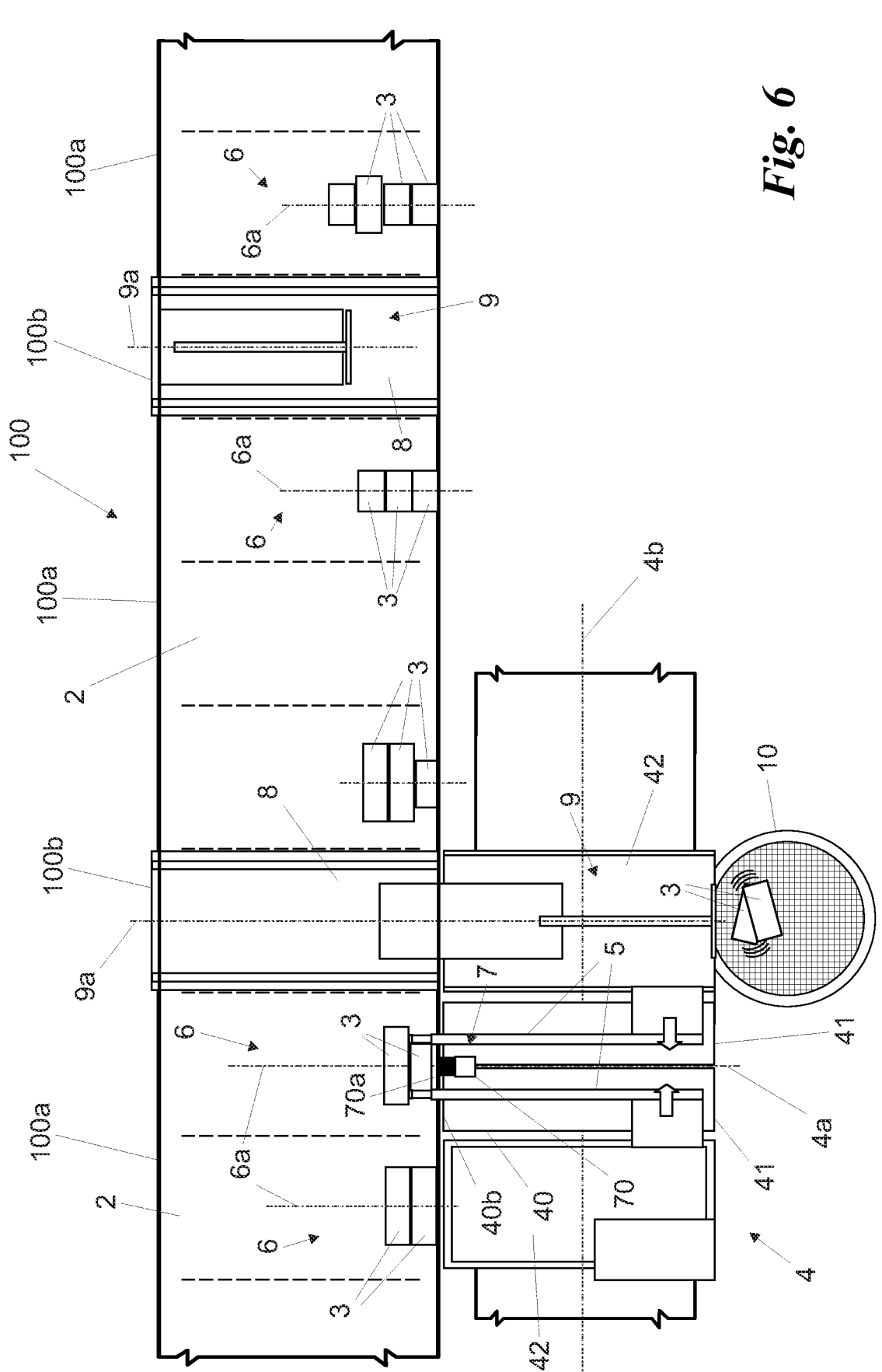
FIG. 6 shows a last moment of the repositioning step and the delivery prompting step.

Thus, the frame 4 can be moved so as to place the side 42 in front of the sorting surface 8, along the pushing direction 9*a*, and allow the pusher 9 to push one or more boxed items 3 onto the side 42 and thus to the stacking unit 10, as shown for example in FIGS. 5-6.

In conclusion, if the distributor is part of a counter 100, the latter may include at least a second compartment 100*b*. Similarly to the first compartment 100*a*, the second compartment 100*b* consists of a shelving including at least one floor defining the sorting surface 8.

Thus, if the counter 100 is equipped with a distributor which includes the unit 1 according to the invention, the frame 4 is configured to be able to move from the first compartment 100*a* to the second compartment 100*b*, and vice versa.

The invention also teaches a new automated handling procedure for boxed items 3 and similar.

The procedure can be implemented by a distributor that includes the unit 1 as previously described, possibly implemented within a counter 100. Alternatively, the procedure can be realized by any other unit capable of moving boxed items 3, as described for example in patent EP-B-2862817.

In any case, preferably, the procedure includes a positioning step where boxed items 3 on the storage surface 2.

In particular, preferably, the boxed items 3 are aligned in rows 6 along a respective predominant development direction 6*a*.

Moreover, the boxed items 3 are arranged in decreasing dimensional order for each row 6 towards the first edge 20 of the storage surface 2.

Therefore, the boxed items 3 are ready to be subsequently handled.

The procedure then also includes a translation step.

During the translation step, preferably a group of boxed items 3 consisting of at least a portion of a row 6 is unitarily translated along the predominant development direction 6*a* onto a handling surface 40 of a frame 4 facing the first edge 20.

Advantageously, during the translation step, an entire row 6 is translated along the predominant development direction 6*a* so that the remaining row 6 on the storage surface 2 is adjacent to the first edge 20 of the storage surface 2.

Naturally, translation can be implemented by gripping bars 5 developing near the handling surface 40 parallel to the predominant development direction 6*a*. As previously already described, the gripping bars 5 are preferably placed side by side and spaced apart so as to flank at least part of the row 6 and are configured to engage and translate at least part of the boxed items 3 of row 6.

Moreover, during translation, a hindering means 7 positioned close to the handling surface 40 can stop the group being moved on the handling surface 40 at a position occupied by the hindering means 7 itself.

In particular, the hindering means 7 is positioned so that the end boxed item 3 is positioned at a second edge 40*b* of said handling surface 40 adapted to face the first edge 20 and a sorting surface 8.

The procedure then also includes a movement step.

During the movement step, the frame 4 is moved close to the sorting surface 8 so that the handling surface 40 is aligned with the sorting surface 8.

The procedure also includes a handling step.

In the handling step, preferably, at least one end boxed item 3 of the group is handled from the handling surface 40 onto the sorting surface 8.

The handling step could be implemented by the gripping bars 5.

Or, the handling step can be implemented by the handling surface 40 and/or the hindering means 7.

Indeed, the handling surface 40 can be mobile along a central axis 4*a* which can be aligned with the predominant development direction 6*a* so as to be able to translate said boxed items 3 placed thereon at least along the predominant development direction 6*a*. Therefore, in the handling step, the handling surface 40 can translate at least the end boxed item 3 onto the sorting surface 8.

Moreover, the hindering means 7 can be mobile relative to the handling surface 40. Therefore, in the handling step, the second edge 40*b* can be placed close to the sorting surface 8 and the hindering means 7 can push the group along the central axis 4*a* so that one or more boxed items 3 of the group go beyond the second edge 40*b* and are stored on the sorting surface 8.

The procedure then includes a step of returning the handling surface 40 close to the storage surface 2. This step is useful to clear the sorting surface 8 for a following step.

Indeed, the procedure includes a step of sending to delivery.

In the sending to delivery step, preferably, at least one boxed item 3 on the sorting surface 8 is sent to delivery. For example, the sending to delivery is implemented by a pusher 9 placed on the sorting surface 8 and movable relative to the sorting surface 8 along at least the pushing direction 9a so as to push one or more boxed items 3 placed on the sorting surface 8 far from the sorting surface 8.

Moreover, during the sending to delivery step, the pusher 9 can, in particular, push one or more said boxed items 3 placed on the sorting surface 8 out of the sorting surface 8 so that the boxed items 3 fall by gravity into a stacking unit 10 placed near the sorting surface 8.

Moreover, the procedure may also include a repositioning step.

In the repositioning step, preferably, the remaining boxed items 3 of the group are repositioned on the storage surface 2 at a row 6. The latter can correspond to row 6 from which the boxed items 3 were handled or could also be another row 6.

During repositioning, preferably, the hindering means 7 pushes one or more remaining boxed items 3 along the central axis 4a so that one or more boxed items 3 of the group exceed the second edge 40b and are placed on the storage surface 2 and push row 6 along the predominant development direction 6a. Preferably, during repositioning, the gripping bars 5 surround and compact row 6.

Naturally, this step could also or alternatively involve the movement of the handling surface 40 along the central axis 4a.

Unit 1, and its related procedure, for the automated handling of boxed items according to the invention achieve significant advantages.

Indeed, the unit 1 and the automated handling procedure for boxed items can be easy to implement and achieve, thus being able to offer maximum functionality guarantees and implementable lower.

Moreover, the unit 1 and the automated handling procedure for boxed items are able to optimally exploit the spaces available on the shelves of the shelving unit.

In conclusion, the unit 1 and the automated handling procedure for boxed items are able to simultaneously handle multiple boxed items or similar, thus achieving maximum loading and unloading speed for the boxed items.

In this context, all parts are replaceable with equivalent elements and the materials, shapes, and dimensions can be any.

The invention claimed is:

1. Automated handling procedure for boxed items (3) comprising:

placing on a storage surface (2) boxed items (3) aligned in rows (6) along a respective predominant development direction (6a) in dimensionally decreasing order, for each said row (6), towards a first edge (20) of said storage surface (2);

unitarily translating along said predominant development direction (6a) on a handling surface (40) of a frame (4) facing said first edge (20) a group of said boxed items (3) consisting of at least a portion of a said row (6); and wherein during said translation, an entire said row (6) is translated along said predominant development direction (6a) so that said residual row (6) on said storage surface (2) is adjacent to said first edge (20);

and by further comprising:

moving said frame (4) close to a sorting surface (8) so that said handling surface (40) is aligned with said sorting surface (8);

taking at least one said end boxed item (3) of said group from said handling surface (40) onto said sorting surface (8);

returning said handling surface (40) close to said storage surface (2);

repositioning any of the residual said boxed items (3) of said group onto said storage surface (2) at a said row (6), and sending to delivery said at least one boxed item (3) on said sorting surface (8).

2. Procedure according to claim 1, wherein said repositioning is carried out on the one said row (6) corresponding to said row (6) from which said boxed items (3) were handled or on another said row (6).

3. Procedure according to claim 1, wherein said translation is carried out by gripping bars (5) developing near said handling surface (40) parallel to said predominant development direction (6a) and being mutually side by side and spaced apart in such a way as to be able to flank at least part of said row (6) and configured to engage and translate at least part of said boxed items (3) of said row (6).

4. Procedure according to claim 1, wherein said handling surface (40) is movable along a central axis (4a) alignable with said predominant development direction (6a) so as to be able to translate said boxed items (3) placed therein at least along said predominant development direction (6a) and, during said handling step, said handling surface (40) translates said end boxed item (3) onto said sorting surface (8).

5. Procedure according to claim 1, wherein during said translation a hindering means (7) positioned close to said handling surface (40) stops said moving group on said handling surface (40) at a position occupied by said obstacle (7) so that said end boxed item (3) is positioned at a second edge (40b) of said handling surface (40) adapted to face said first edge (20) and said sorting surface (8).

6. Procedure according to claim 5, wherein said hindering means (7) is movable with respect to said handling surface (40) and, in said handling step, said second edge (40b) is positioned close to said sorting surface (8) and said hindering means (7) pushes said group along said central axis (4a) so that one or more said boxed items (3) of said group go beyond said second edge (40b) and are placed on said sorting surface (8).

7. Procedure according to claim 3, wherein during said repositioning, said obstacle (7) pushes said one or more residual boxed items (3) along said central axis (4a) so that said one or more boxed items (3) of said group go beyond said second edge (40b) and are deposited on said storage surface (2) and push said row (6) along said predominant development direction (6a) while said bars (5) encircle and compact said row (6).

8. Procedure according to claim 1, wherein said step of sending to delivery is carried out after said return step.

9. Procedure according to claim 1, wherein said step of sending to delivery is carried out by a pusher (9) positioned on the sorting surface (8) and movable with respect to the sorting surface (8) along at least one thrust direction (9a) so as to push out of said sorting surface (8) one or more said boxed items (3) placed on said sorting surface (8).

10. Procedure according to claim 1, wherein during said step pf sending to delivery, said pusher (9) pushes out of said sorting surface (8) said one or more boxed items (3) placed on said sorting surface (8) so that said boxed items (3) fall by gravity into a stacking unit (10) positioned near said sorting surface (8).

* * * * *